United States Patent
Walawender (10) Patent No.: US 6,220,864 B1
(45) Date of Patent: Apr. 24, 2001

(54) THREE-DIMENSIONAL EDUCATIONAL ROLE-PLAYING GAME APPARATUS AND METHOD OF USE

(76) Inventor: Valerie Walawender, 2847 Rte. 39, Forestville, NY (US) 14062

(*) Notice: Subject to any disclaimer, the term of this patent is extended or adjusted under 35 U.S.C. 154(b) by 0 days.

(21) Appl. No.: 09/153,589

(22) Filed: Sep. 15, 1998

Related U.S. Application Data (60) Provisional application No. 60/058,795, filed on Sep. 15, 1997.

(51) Int. Cl.⁷ .................................................. G09B 19/00
(52) U.S. Cl. ........................... 434/236; 422/63; 446/321; 446/219
(58) Field of Search .................................. 446/321, 219; 472/57, 63, 72; 434/219, 236, 237, 238, 308, 317

(56) References Cited

U.S. PATENT DOCUMENTS

| | | | |
|---|---|---|---|
| 1,590,463 | * 6/1926 | Wood | 472/63 |
| 2,222,084 | * 11/1940 | Marx | 472/63 |
| 3,156,758 | * 11/1964 | Tregubenko | 472/63 |
| 3,612,516 | * 10/1971 | Wilson | 472/63 |
| 3,614,540 | * 10/1971 | Vadell | 434/217 |
| 4,365,798 | * 12/1982 | Shields et al. | 472/57 |
| 4,720,184 | * 1/1988 | Watson | 472/63 |
| 5,046,986 | * 9/1991 | Wood et al. | 446/321 |
| 5,201,660 | * 4/1993 | Copen et al. | 434/236 |
| 5,787,618 | * 8/1998 | Mullis | 472/63 |

* cited by examiner

Primary Examiner—Sam Rimell
(74) Attorney, Agent, or Firm—Hodgson, Russ, Andrews, Woods & Goodyear, LLP (57) ABSTRACT

The invention is directed to an interactive role playing kit and method for exploring social, man-made or natural environments. The kit includes pictorial representations of members of an environment, such as individuals of a given race, gender or culture, a mirror, and a mask allowing an individual to assume an identity which can be viewed by reflection in the mirror. The kit may also be provided with a display stand and carrying case.

11 Claims, 9 Drawing Sheets

THREE-DIMENSIONAL EDUCATIONAL ROLE-PLAYING GAME APPARATUS AND METHOD OF USE

CROSS-REFERENCE TO A RELATED APPLICATION

This application claims priority on an earlier filed provisional application Ser. No. 60/058,795, filed on Sep. 15, 1997, which is incorporated herein by reference.

BACKGROUND OF THE INVENTION

1. Field of the Invention

The present invention relates generally to games and gaming apparatus, and more particularly to an educational role-playing and discussion game which challenges players, interpretation of and sensitivity to the perspectives and perceptions of other people, animals and objects in our environment.

2. Prior Art

Various games involving exchanges of questions and answers concerned with knowledge of or attitudes about ethics, relationships and human conduct are known in the art.

For example, games based on the abilities of players to accurately predict the responses of other players to moral questions, exemplified by U.S. Pat. No. 4,635,939 to Makow, are known and may include challenges requiring verbal justification of answers and assessments of a respondent's sincerity.

None of the games of the prior art, however, foster discussion of racial, cultural, gender or other issues from the perspective of one assuming the identity of a member of a racial, ethnic or gender which is different than the group to which the player belongs. Further, none of these games provide a means for assuming an identity of another person, an animal or an object such that a player can transform him or herself in a realistic way to take on the characteristics of that other person, animal or object while playing the game.

It is desirable, therefore, to have a role playing game, which can be used to teach geographic principles, for therapeutic purposes with custom designed figures manipulated for family sculpting or group dynamic exploration, or for fantasy play.

SUMMARY OF THE INVENTION

Accordingly, it is an object of the present invention to provide an educational role playing game a which provides an effective means for allowing a player to assume an alternate identity, and to test his or her reactions and perceptions to selected groups of other individuals while engaging in play of the game. The groups of other individuals may be represented by various pop-up figures, computer graphics renderings, photographs, still of motion video projections, sculptures, or any other means for presenting a human, animal, or insect image.

Multi-culturalism, stigma, prejudice, empathy, and compassion are able to be explored in a meaningful way by employing the apparatus and method of the present invention, wherein over various photographs of children, teens, adults, the elderly, racial groups, ethnic groups, the physically and mentally challenged, and individuals with various identifiable occupations are arranged in a series of pop-up or die-cut pages flanking a mirror affixed in a center position. Each group displays one emotion. When the pop-up book is opened in its stand-up position on a flat surface, the player (or viewer) sees his or her own image surrounded by the social environment created by the adjoining pages. Complex issues surrounding one's physical appearance, group identification, and human relations are able to be explored in this game in a simple, yet powerful way. Aside from individual enjoyment, the book sculpture can be used as a sensitivity and diversity training in schools, the workplace or as a table sculpture in the home.

To further enhance the impact, the invention incorporates a storage box to hold masks (with Velcro™ attachable hand-held holders) the player may view the piece through. The storage box also stores display stands for the sculpture book and a variety of card packs grouped to help catalyze discussion and thought. The books and storage box are both transported in a carrying case with a vinyl strap handle. The carrying case also acts as packaging for merchandising shelf display.

In particular, the invention comprises a series of pop-up books with each pop-up page depicting a different social environment (children, the elderly, men, women, Hispanics, African Americans, Native Americans, Asians, angry people, fearful people, happy people, etc.) The pop-up books are stored in a case. One face of the cube is a mirror. When set up, the mirror is placed in the middle of two pop-up books opened to social environments of the same nature. Masks (with the eyes cut out) are included in the package. The player looks at his or her image through the mask surrounded by different social environments. Thus a Native American man may wear a mask to assume the identity of a "Hispanic female child" who may "see" herself surrounded by a group of people.

Through a number of interactive exercises, users are provided opportunities to enhance their social comfort zones, increase tolerance, and explore their assumptions, beliefs and attitudes. By increasing one's capacity for empathy, the likelihood of discrimination, harassment, prejudice and bias are lessened.

The present invention is especially valuable to educators, as the exercises are designed to be sensitive to individual needs, non-threatening, and yet help students and teachers increase their awareness of some of their deepest and least accessible roots beliefs and attitudes concerning other people. Individual teachers can decide on the appropriateness for their students age and maturity for each exercise.

Accordingly, the present invention is generally characterized as an apparatus and a method for playing a game of assumed identity and role play which includes discussion based on questions related to interpersonal perceptions and perspectives, the discussion elicited by means of situation, question cards or any other means selected by a player.

DETAILED DESCRIPTION OF THE INVENTION

Figure 1:
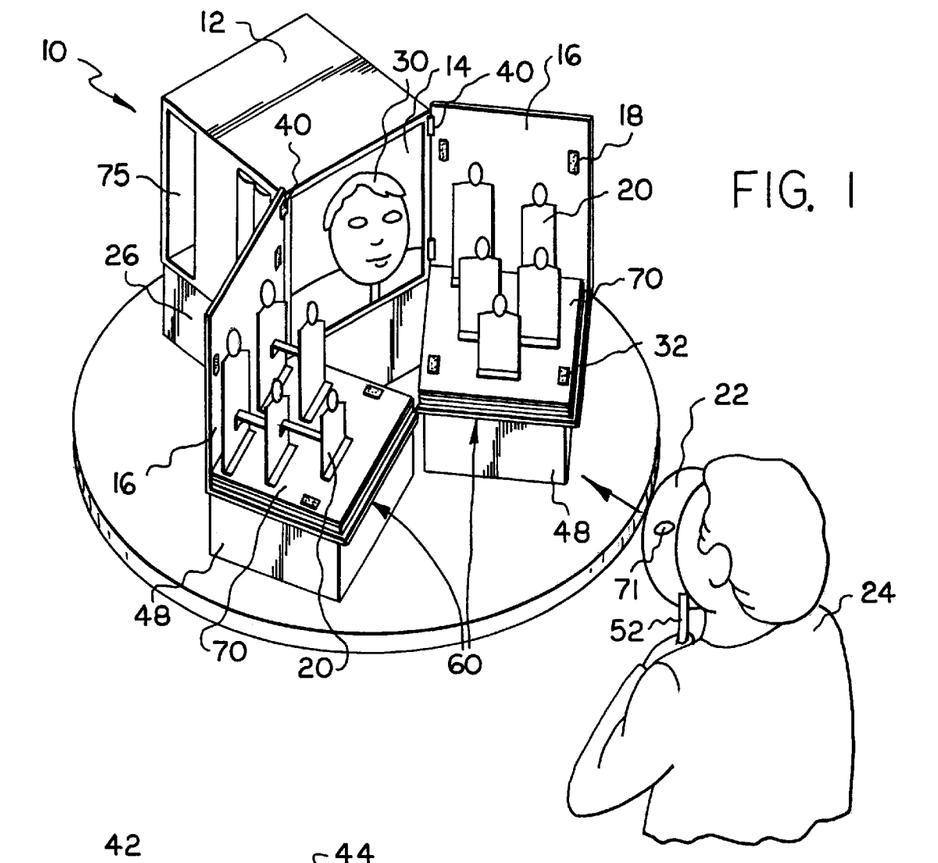
FIG. 1 is a perspective view of a preferred embodiment of the game apparatus of the present invention.

FIG. 1 is a perspective view of one of the embodiments of the game apparatus 10 of the present invention. FIG. 1 shows a player 24 assuming an alternative identity via the use of a mask 22 and mirror 14. In a preferred embodiment of the present invention, mask 22 represents the face of a member of a racial, ethnic, gender, social or other group to which player 24 does not belong. Mirror 14 is preferably a high quality non-breakable mylar mirror. Mask 22 may represent the face of either a male or female adult or child, and may have young or old facial characteristics. According to another aspect of the present invention, mask 22 may represent the face of any of a number of animals. Mask 22 may be constructed from cardboard, paper, plaster or any other suitable material for containing a drawing, photograph or other representation of the face of an individual. Mask 22 may be two or three dimensional and includes a detachable handle 52 which is removably affixed to the bottom of mask means 22 by Velcro™ tabs or other known affixing means (best illustrated in FIG. 4).

In playing the game according to a preferred method of the present invention, player 24 places mask 22 in front of player 24's face. Player 24 then looks into mirror 14 to see his/her reflection 30. Reflection 30 is an identity representation that contains elements of player 24's identify in combination with elements of the identity of the group member represented by mask 22. In that manner player 24 can more effectively play the role of the group member represented by mask 22. As player 24 assumes the identity of the individual represented by mask 22 he or she is presented with a series of questions related to his or her experience or related to any other subject matter of the game. The questions are preferably contained on cards such as those depicted at 76 in FIG. 4.

In continuing play according to a preferred method of the present invention, player 24 looks through holes 71, which are placed in the location of the eyes of mask 22, while gazing upon a mirror 14 and also upon one or more pop-up FIG. 20 which surround mirror 14 on both sides. Pop-up FIG. 20 represent individual members of various cultural, ethnic, social, racial or other groups. Pop-up FIG. 20 may represent young or old, or male or female figure individuals and may assume a wide variety of facial expressions which express joy, anger, disapproval, sorrow, or any other emotion or expression.

In practicing the method of the invention, a player uses non-judgmental reflections, thought provoking questions and "I-statements" to foster discussion, involving small and large groups of participants are reminded that almost all exercises involve role-playing, and statements that they think another might use in their role play do not necessarily reflect their own beliefs. Because of the sensitivity of the topic, a gentle, non-judgmental atmosphere is maintained and discussions should remain open-ended. Each play is designed to foster discussion around a certain topic: assumptions, labels, age, gender, race, secrets, disabilities, etc., reminding students that each person holds "part of the truth" and therefore every person's contributions are important and avoiding "you (or he or she) should" or "you (he or she) shouldn't" statements. The discussion is rather focussed on the attitudes and beliefs that exist and why they exist, the validity of thinking patterns and decision making processes.

Figures 3, 4:
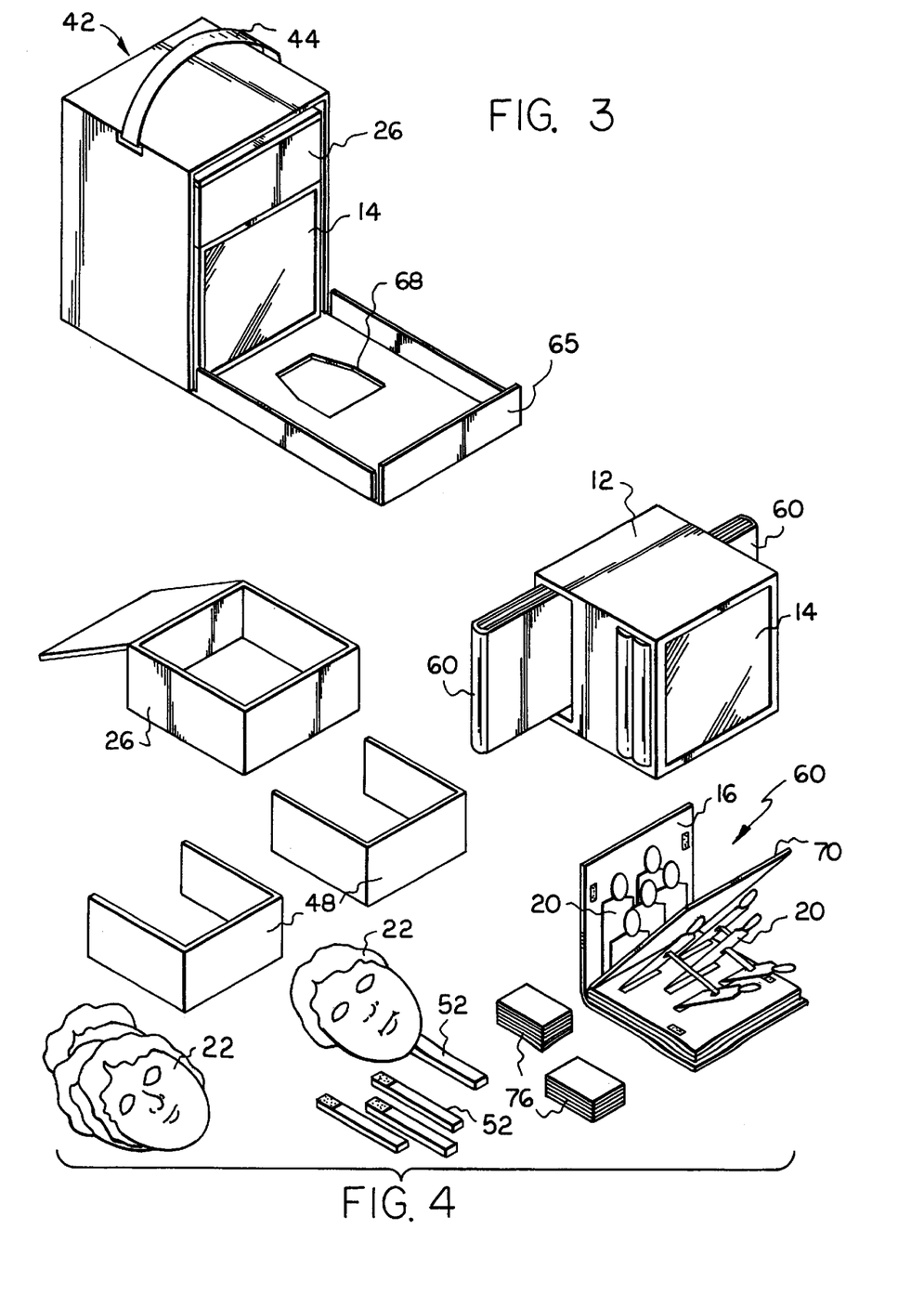
FIG. 3 is a perspective view of the means for stowing and carrying shown in FIG. 2 as it appears when components of the apparatus of the present invention are contained therein.
FIG. 4 is a perspective view of the major components of the present invention as would be stowed and carried in the means for stowing and carrying shown in FIG. 2.

In a preferred embodiment of the present invention, one or more pop-up FIGS. 20 comprising a collection are affixed to a page 70 of book 60. Book means 60, as best illustrated in FIG. 4, may contain one or more pages 70, each page 70 holding a collection of pop-up FIGS. 20. A collection of pop-up FIGS. 20 may be comprised of a homogenous group of individuals, that is, all belonging to the same group or class, or may comprise a mixture of individuals of different racial or ethnic groups, ages, or genders. Each of pop-up FIG. 20 in collection is affixed to a page 70 of book 60 by means of glue, staples, or other affixing means, such that each pop-up FIG. 20 is capable of being folded downwardly to lay flat against page 70 when book 60 is closed. According to a preferred method of the present invention, prior to or during the game, book 60 may be opened and a page 70 selected which comprises the desired collection of pop-up FIGS. 20.

The selected page 70 is opened and affixed to cover page 16 of book 60 such that pop-up FIG. 20 of the selected page assume an upright position. Cover page 16 is provided with one portion 18 of a dual portion affixing means such as Velcro™ tabs. Individual pages 70 are provided with the other portion 32 of the affixing means such that the two portions interlock to support the selected page in an upright position during play.

Pop-up FIGS. 20 may be printed on a deck of cards, similar to "playing" cards.

Cover page 16, in turn, is held in an upright position during play in connecting cover page 16 to first box means 12 by means of cover page connecting means 40. Cover page connecting means 40 may comprise hinges, Velcro™ strips or any other connecting means commonly known in the art for removably interconnecting elongated components such as cover page 16 and box 12. The respective cover pages 16 of two books 60 may be connected to each side of box 12 such that one cover page 16 of a book 60 is affixed to a side of mirror 14 as illustrated in FIG. 1.

In a preferred embodiment, book 60 rests upon bookstand 48. Bookstand 48 supports book 60 in relation to mirror 14 such that pop-up FIGS. 20 appear to surround the image of player 24 as player 24 gazes into the mirror 14 while wearing mask 22. A bookstand 48 may be provided on both sides of mirror 14 such as illustrated in FIG. 1. so as to achieve the effect of player 24 being surrounded by the people represented by pop-up FIGS. 20. Box 12 may be supported by box stand 26 such that mirror 14 is elevated to a convenient height for play, preferably aligning with the face of player 24.

Box 12 includes mirror 14 which is affixed by glue or other conventional means to one side of box means 12. Box 12 may be constructed of cardboard, plastic or other durable, sturdy material which is capable of supporting mirror 14, as well as other items as described hereinafter. Box 12 further includes one or more compartments 75 for receiving and stowing books 60. Compartments 75 may be used to stow books 60 when game apparatus 10 is not in use, or may be used to hold extra books 60 which are not being used in a particular game.

Box 12 is preferably manufactured of sturdy high quality die-cut, printed, folded and glued cardboard.

Figure 2:
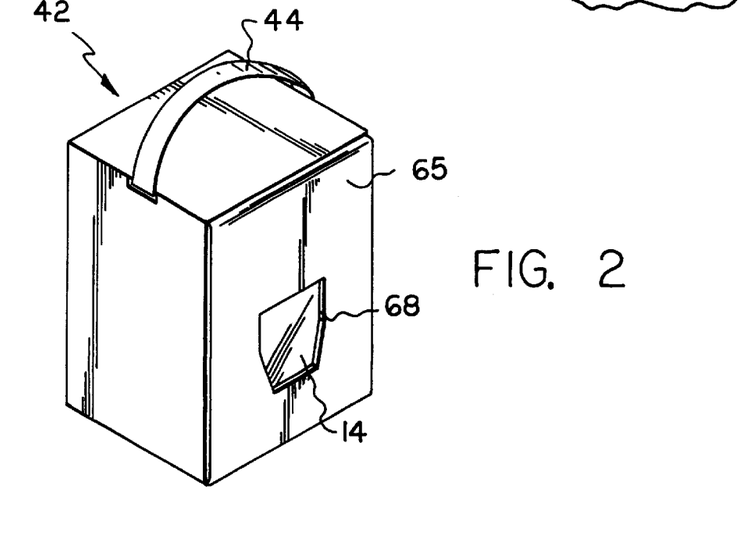
FIG. 2 is a perspective view of the means for stowing and carrying according to a preferred embodiment of the present invention.

FIG. 2 illustrates means 42 for stowing any carrying game 10. When game 10 is not in use, the components described hereinabove may be stored in means 42 for stowing and carrying game 10. Means 42 for stowing and carrying game 10 can include handle means 44 and door means 65 (as best illustrated in FIG. 3). Door means 65 may include an opening 68 through which mirror means 14 is visible.

As best illustrated in FIG. 3, box 12 may be placed inside means 42 for stowing and carrying game 10, such that mirror means 14 faces outwardly. Box stand 26 may then be placed on top of box 12 within means 42 for stowing and carrying game 10. Box stand 26 comprise a closable compartment within which various game pieces such as mask 22, handles 52 and cards 76 may be stored when game 10 is not in use. In addition bookstand 48 may be placed within box stand 26 for storage purposes. When the various components of game 10 just described are placed inside means 42 for receiving and stowing game 10, door means 65 may be closed and secured. In that manner, all of the components of game 10 are neatly stored in an organized manner, and can be readily transported or stowed for future use.

Figure 5:
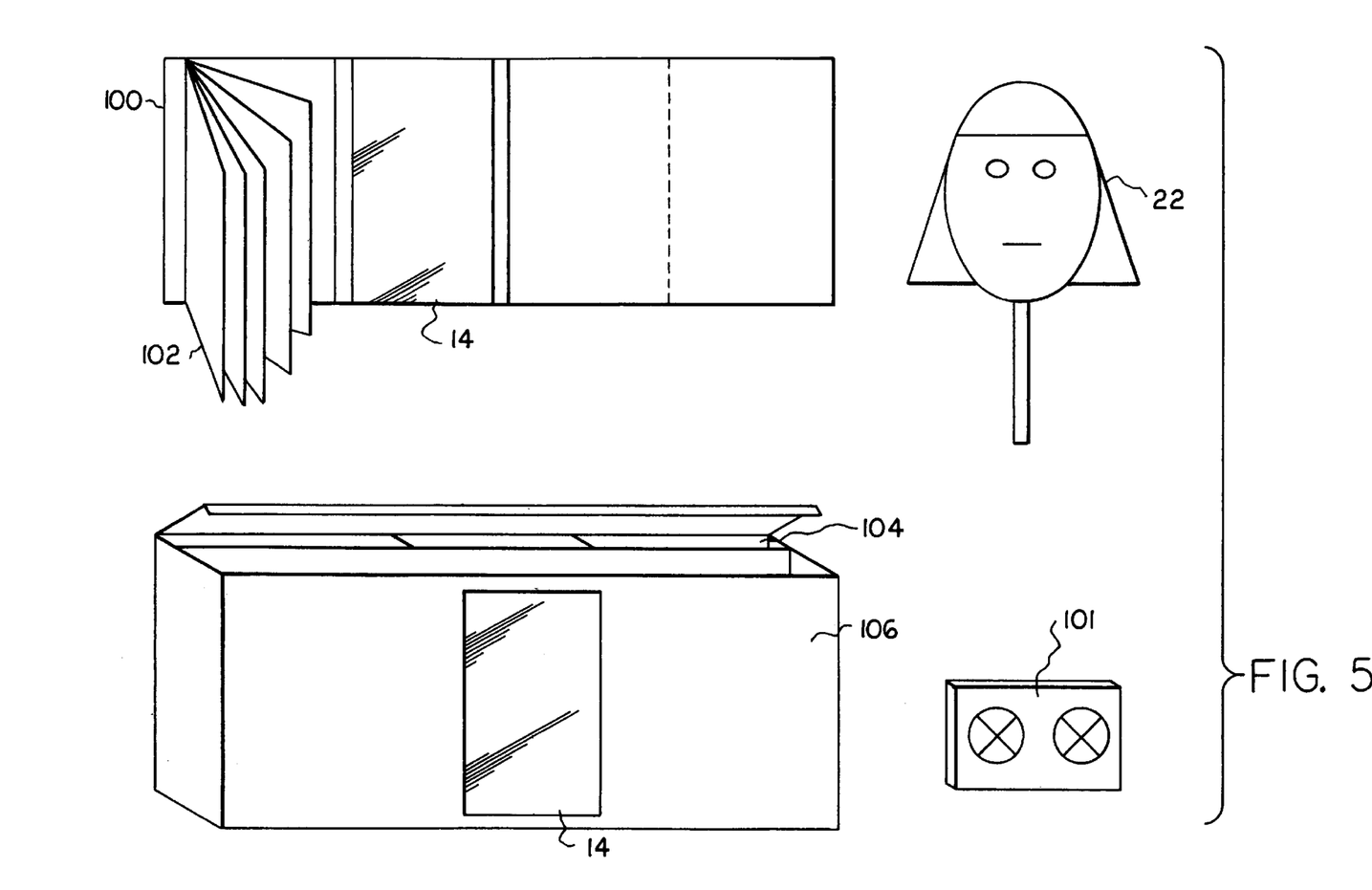
FIG. 5 is a perspective view of an alternative embodiment of the game apparatus of the present invention.

FIG. 5 shows an alternative structure for the apparatus of the present invention.

A pop-up book 100 exploring the themes of social, man-made or natural environments comprises multiple pages 102. A player wearing mask 22 will see his or her reflection in mirror 14, which can be tilted to give the player a better adjusted view of the reflection. Pages 102 of pop-up book 100 can be tied together with ribbon ties, Velcro™ or any other suitable mean for tying the paper. One or more masks 22 are stored in a storage area 104 of a box 106. Storage area 104 is large enough to accommodate the pop-up figures, masks, instruction booklets and other requisites for playing the game.

A sound element 101 can be used with the invention to introduce pre-recorded voices, conversations, music into the game of the present invention.

Other embodiments of the present invention may include holographic images as alternatives to pop-up FIGS. 20, in order to provide an even more realistic representation and simulation of persons, animals and objects in a player's immediate environment.

Figure 6:
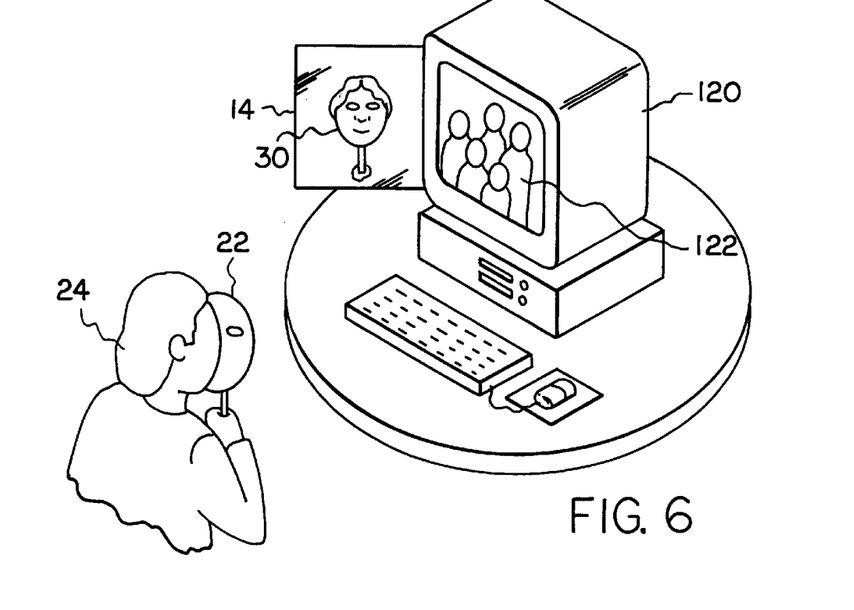
FIG. 6 is a perspective view of an alternative embodiment of the present invention as implemented on a computer.

As shown in FIG. 6, another embodiment of the present invention includes the use of computerized graphics images 122, or video representations for simulation of persons, animals and objects in a player's environment. To assume an alternate identity, player 24 may use mask 22 to assume an identity of another character, then view reflection 30 of the assumed identity in mirror 14 to answer questions or describe emotions as a part of the role-playing game. Alternatively, computer representations of the player which alter the player's own characteristics to more closely emulate the characteristics of the role a player wishes to assume may also be employed.

Figure 7:
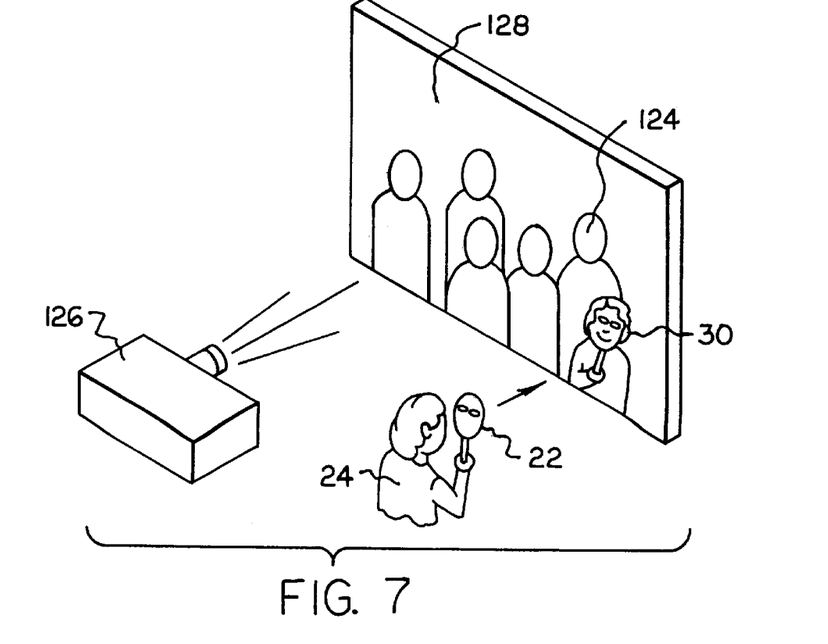
FIG. 7 is a perspective view of an alternative embodiment of the present invention as implemented by a slide projector.

FIG. 7 shows another embodiment of the invention in which a slide projector 126 is utilized to project group images 124 on a screen 128. Screen 128 can also comprise a mirror.

Figure 8:
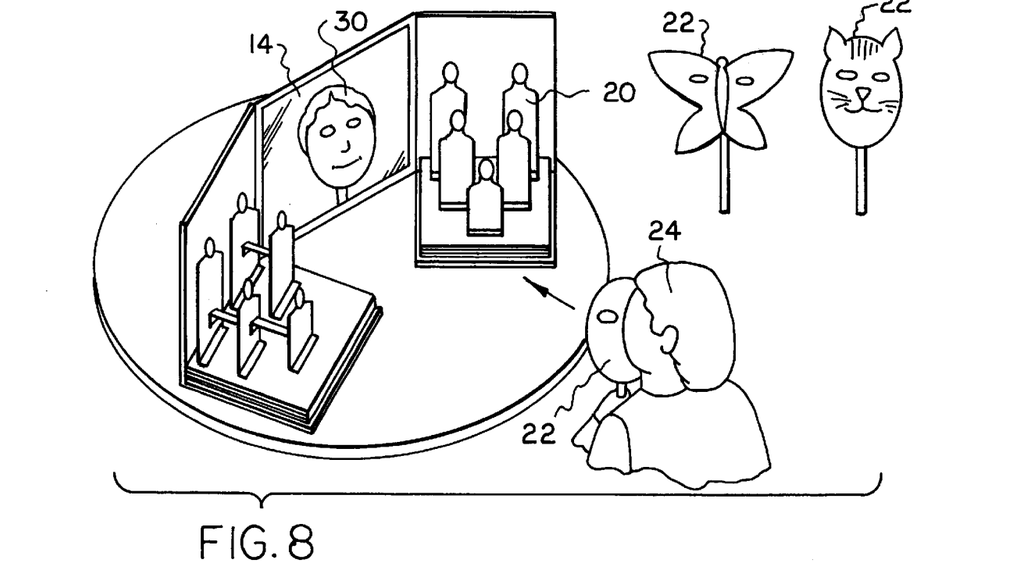
FIG. 8 is a perspective view of an alternative embodiment of the present invention including a moveable elongated mirror means.

FIG. 8 shows an alternative embodiment wherein mirror 14 is elongated and adjustable such that player 24 may select the most desirable position for play.

Figures 8A, 9:
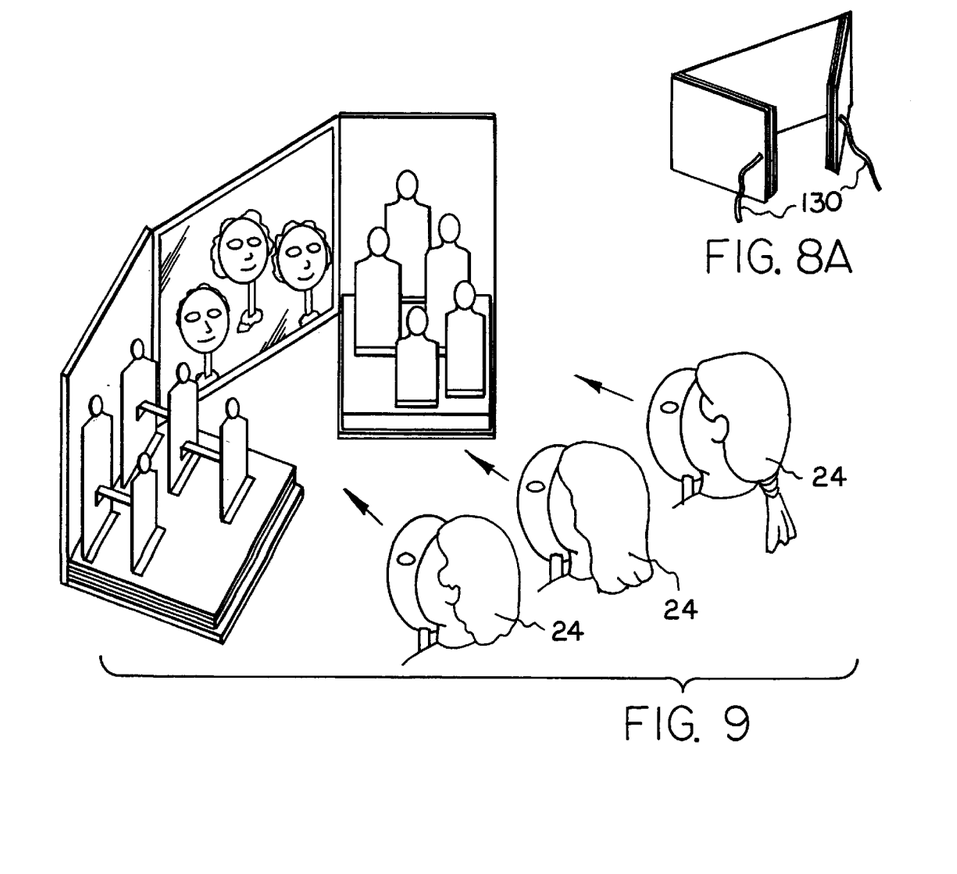
FIG. 8A is a perspective view of an alternative embodiment for book means featuring ribbon ties.
FIG. 9 is a perspective view of an alternative embodiment of the present invention whereby the apparatus is constructed on a larger scale and the game is played by a group of players.

FIG. 8A shows an alternative embodiment of the book means in which ribbon ties 130 are used to close the book means for storage.

FIG. 9 shows an embodiment of the invention wherein the dimensions of the apparatus of the present invention are enlarged such that a group of players 24 may engage in the game, all at the same time.

Figures 10, 11:
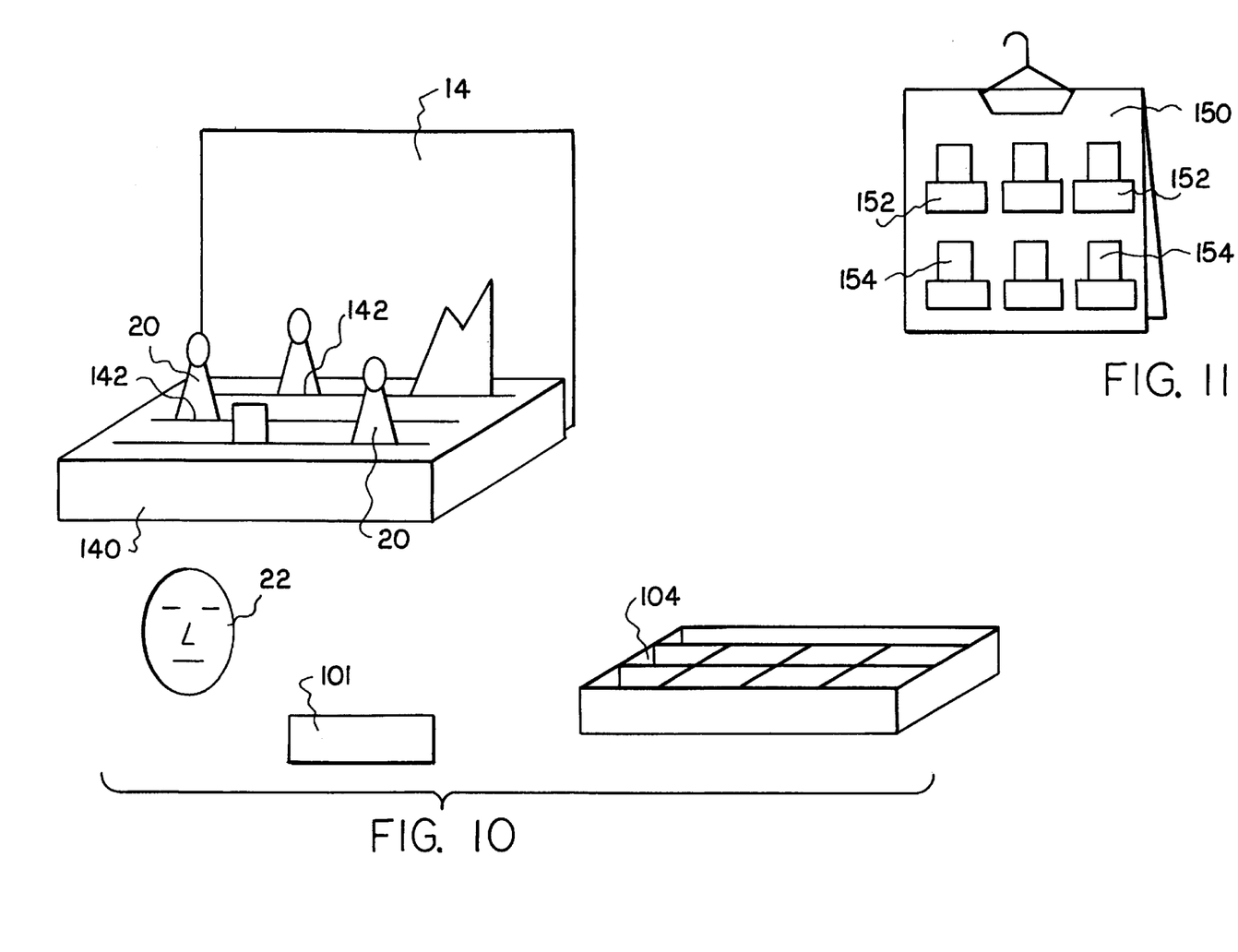
FIG. 10 is a schematic representation of the present invention, wherein a box with slots holds individual pop-up figures.
FIG. 11 is a schematic view of a wearable vest with pop-up figures fit into pockets.

Shown in FIG. 10 is an embodiment of the interactive game comprising a box 140 with slots 142 to hold individual pop-up figures or card 20. Mirror 14 is situated behind box 140. It is contemplated that instead of mirror 14 a "see through" plastic sleeve can be used to hold cards showing various backgrounds. FIGS. 20 can be easily rearranged in slots 142 and can comprise detachable custom photos of participants for therapeutical and other special uses. FIGS. 20 and various backgrounds can depict fantasy or realistic geographic details and people as a learning tool. Sound element 101 provides recorded voices, conversations or music, as may be desirable for the purposes of the invention. Storage compartments 104 fit inside box 140. Compartments 140 store various elements of the game, such as cards, mirror, background cards, maps and others.

FIG. 11 shows a wearable vest 150 as an additional element which can be used in an educational setting. In this embodiment, the vest has pockets 152 which exist to hold cards 154 that graphically or typographically depict various geographic, architectural, or cultural elements. A student or teacher can collect cards 154 from a storage compartment 104 which holds card packs for the pop-up component or from vest 150.

Figure 12:
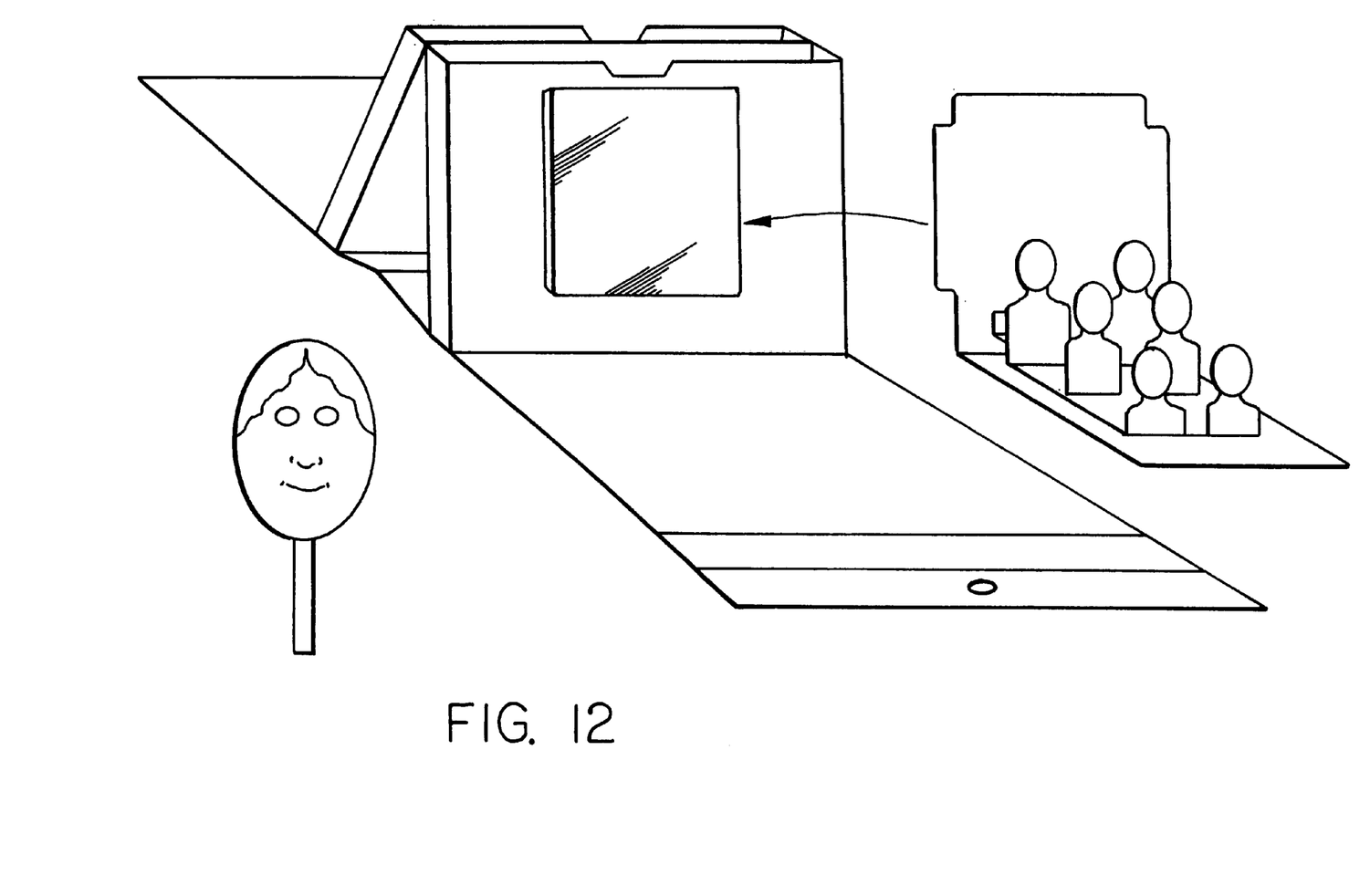
FIGS. 12–14 present a view of an alternative embodiment of the invention.
Figure 13:
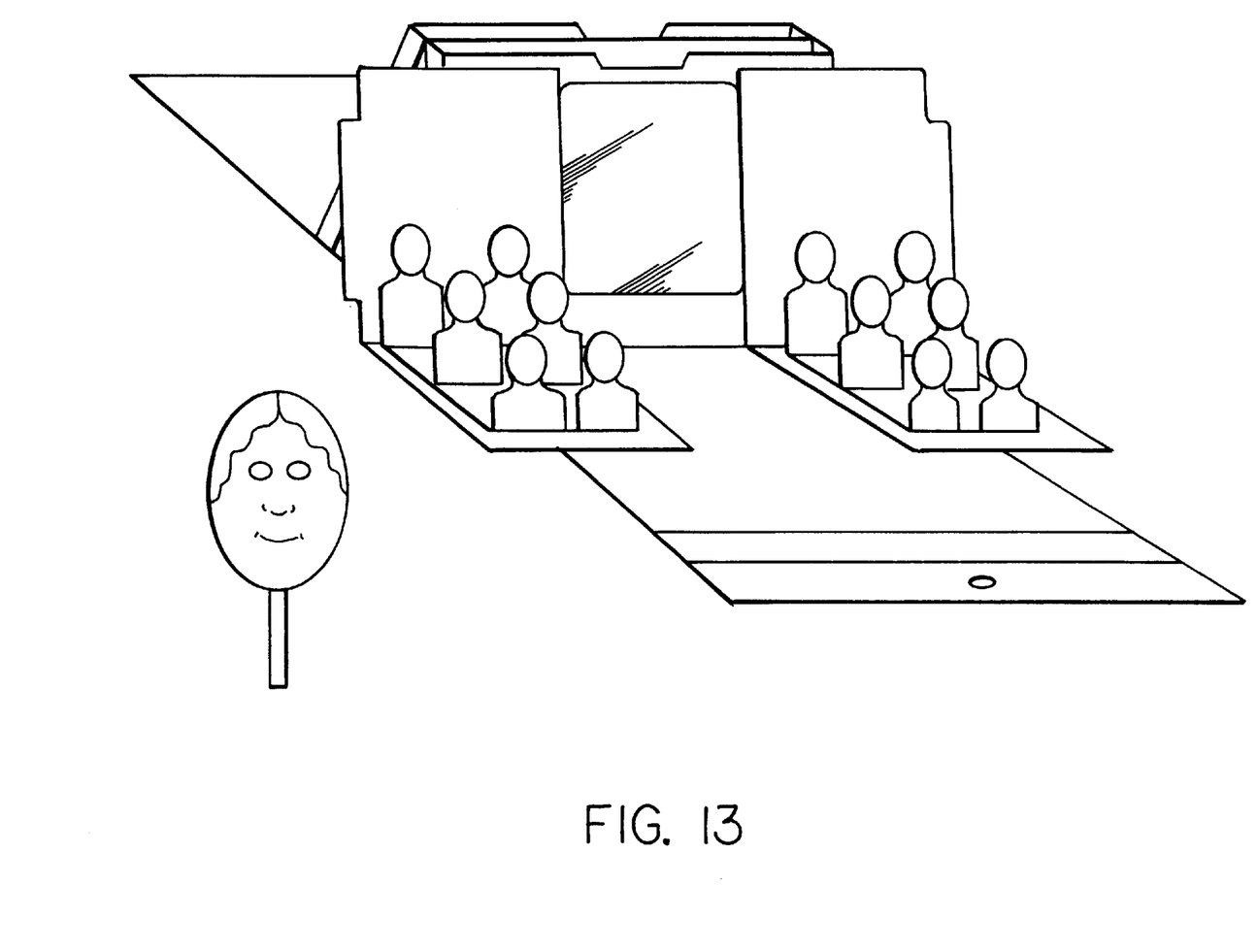
Figure 14:
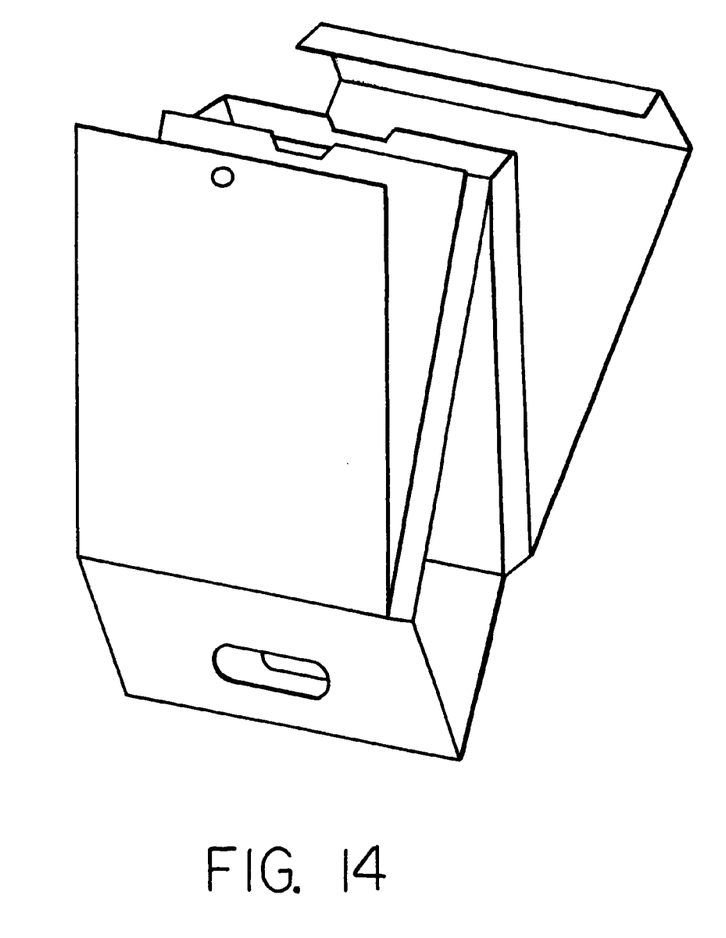

In FIG. 12, open end boxes for storing are shown. The boxes have a non-glass mirror attached by Velcro® fasteners. A pop-up includes tabs. In FIG. 13, the pop-ups are attached on opposite sides of the mirror by tabs. In FIG. 14, The flap goes over the top and Velcro® fasteners lock the panels together. The contents of the set are packed into both open boxes. The handle pulls down and the boxes fold by means of a hinge.

It is intended that the above description of preferred embodiments of the structure of the present invention and the description of its operation are but one or two enabling best mode embodiments for implementing the invention. Other modifications and variations are likely to be conceived of by those skilled in the art upon a reading of the preferred embodiments and a consideration of the appended drawings. These modifications and variations still fall within the breadth and scope of the disclosure of the present invention.

What is claimed is:

1. An interactive role-playing kit for exploring various social, man-made or natal environments, the kit comprising:
   a carrying case having a mirror and at least one display stand;
   a plurality of pictorial representations of members of an environment, the plurality of pictorial representations having such shape and size so that they can be carried by at least one display stand; and
   at least one mask with eyeholes adapted to cover the face of a player, the mask having a detachable handle and serving to create an assumed identity of the player, which assumed identity is being reflected in the mirror.

2. An interactive role-playing kit for exploring various social, man-made or natural environments, the kit comprising;

means for displaying an image;

a mirror disposed such that an image in the mirror can be viewed simultaneously with an image on the displaying means:

a computer capable of transmitting a plurality of pictorial representations of members of an environment to the displaying means; and at least one mask with eyeholes adapted to cover the face of a player, the mask serving to create an assumed identity of the player, which assumed identity is being reflected in the mirror.

3. An interactive role-playing kit for exploring various social, man-made or natural environments, the kit comprising:

means for displaying an image;

a mirror disposed such that an image in the mirror can be viewed simultaneously with an image on the displaying means;

a slide projector capable of transmitting a plurality of pictorial representations of members of an environment to the displaying means; and at least one mask with eyeholes adapted to cover the face of a player, the mask serving to create an assumed identity of the player, which assumed identity is being reflected in the mirror.

4. The kit of claim 2, wherein the the plurality of pictorial representations are generated by a computer.

5. A method of exploring various social, man-made or natural environments by using an interactive role-playing kit comprising a case having a mirror and at least one display stand, a plurality of pictorial representations of members of an environment, and at least one mask to cover the face of a player, the method comprising the steps of:

unfolding the case so that at least one display stand and the mirror face the player;

placing the plurality pictorial representations into at least one display stand;

placing the mask over the player's face, so that the player can assume the identity of a member of the environment represented by the mask; and observing the reflection of the player wearing the mask in the mirror, the reflection being indicative of the identity represented by the mask.

6. The method of claim 5, further comprising the step of presenting questions or statements fostering a discussion around social, man-made or natural environment issues faced by the player with the assumed identity.

7. A method of exploring various social, man-made or natural environments by using an interactive role-playing kit comprising a displaying meant comprising a computer and a mirror, means for creating a plurality of pictorial representations of members of an environment on the displaying means, and at least one mask with eyeholes, the method comprising the steps of:

displaying the plurality of pictorial representations on the displaying means;

placing the mask over the player's face, so that the player can assume an identity of a member of the environment represented by the mask; and observing the reflection of the player wearing the mask in the mirror, the reflection being indicative of the identity represented by the mask.

8. A method of exploring various social, man-made or natural environments by using an interactive role-playing kit comprising a displaying means rising a screen and a mirror, means for creating a plurality of pictorial representations of members of an environment on the displaying means, the means for creating the plurality of pictorial representations is a slide projector, and at least one mask with eyeholes, the method comprising the steps of:

displaying the plurality of pictorial representations on the displaying mean;

placing the mask over the player's face, so that the player can assume an identity of a member of the environment represented by the mask; and observing the reflection of the player wearing the mask in the mirror, the reflection being indicative of the identity represented by the mask.

9. A method of exploring various social, man-made ox natural environments by using an interactive role-playing kit comprising a displaying means comprising a screen and a mirror, means for creating a plurality of pictorial representations of members of an environment on the displaying means, and at least one mask with eyeholes, the method comprising the steps of:

displaying the plurality of pictorial representations on the displaying means;

placing the mask over the player's face, so that the player can assume an identity of a member of the environment represented by the mask;

observing the reflection of the player wearing the mask in the mirror, the reflection being indicative of the identity represented by the mask; and presenting information fostering a discussion around issues faced by the player with the assumed identity.

10. A method of exploring various social, man-made or natural environments by using an interactive role-playing kit comprising a displaying means comprising a screen and a mirror, means for creating a plurality of pictorial representations of members of an environment on the displaying means, the creating means comprising a computer, and at least one mask with eyeholes, the method comprising the steps of:

displaying the plurality of pictorial representations on the displaying means;

placing the mask over the player's face, so that the player can assume an identity of a member of the environment represented by the mask; and observing the reflection of the player wearing the mask in the mirror, the reflection being indicative of the identity represented by the mask.

11. An interactive role-playing kit for exploring various social, man-made or natural environments, the kit comprising:

a video monitor;

a plurality of pictorial representations of members of an environment capable of being displayed on the video monitor;

a computer-generated representation of a player's own image, the representation produced by altering the player's image to create an assumed identity;

a computer capable of transmitting the plurality of pictorial representations and the representations of the player's image to the video monitor such that the plurality of pictorial representations and the representation of the player's image can be viewed simultaneously; and, a tangible medium containing information presented to the player to foster a discussion around issues faced by the player with the assumed identity.

* * * * *

UNITED STATES PATENT AND TRADEMARK OFFICE
CERTIFICATE OF CORRECTION

PATENT NO. : 6,220,864 B1
DATED : April 24, 2001
INVENTOR(S) : Walawender

Page 1 of 1

It is certified that error appears in the above-identified patent and that said Letters Patent is hereby corrected as shown below:

Column 6,
Line 54, "natal" should be -- natural --.

Column 7,
Line 51, "meant" should be -- means --.

Column 8,
Line 6, "mean" should be -- means --.
Line 13, "ox" should be -- or --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*